(12) United States Patent
Mundrigi et al.

(10) Patent No.: US 10,864,484 B2
(45) Date of Patent: Dec. 15, 2020

(54) MEMBRANE WITH INCREASED SURFACE AREA

(71) Applicant: Sartorius Stedim Biotech GmbH, Göttingen (DE)

(72) Inventors: Ashok Mundrigi, Bangalore (IN); Jahnavi Gowda, Bangalore (IN); Ramesh Mundlamuri, Bangalore (IN); Thomas Loewe, Göttingen (DE); Holger Linne, Göttingen (DE); Sebastian Handt, Göttingen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 0 days.

(21) Appl. No.: 15/325,770

(22) PCT Filed: Jul. 15, 2015

(86) PCT No.: PCT/EP2015/001459
§ 371 (c)(1),
(2) Date: Jan. 12, 2017

(87) PCT Pub. No.: WO2016/008587
PCT Pub. Date: Jan. 21, 2016

(65) Prior Publication Data
US 2017/0203255 A1    Jul. 20, 2017

(30) Foreign Application Priority Data

Jul. 18, 2014  (IN) .......................... 3545/CHE/2014

(51) Int. Cl.
*B01D 67/00* (2006.01)
*B01D 69/06* (2006.01)

(52) U.S. Cl.
CPC ......... *B01D 67/0086* (2013.01); *B01D 69/06* (2013.01); *B01D 2325/08* (2013.01)

(58) Field of Classification Search
None
See application file for complete search history.

(56) References Cited

U.S. PATENT DOCUMENTS

| | | | |
|---|---|---|---|
| 3,674,722 A * | 7/1972 | Rainer | B01D 39/04 131/332 |
| 3,724,673 A | 4/1973 | Ryon | |
| 5,458,951 A | 10/1995 | Kagawa | |
| 6,132,845 A | 10/2000 | Heinzlreiter | |
| 6,203,741 B1 | 3/2001 | Heinzlreiter | |
| 6,627,291 B1 * | 9/2003 | Clark | B01D 61/18 210/500.1 |
| 6,786,909 B1 | 9/2004 | Dransfeld et al. | |
| 7,309,385 B2 | 12/2007 | Hong et al. | |
| 8,728,214 B2 | 5/2014 | Maurer | |

(Continued)

FOREIGN PATENT DOCUMENTS

| | | |
|---|---|---|
| CA | 2397022 | 2/2003 |
| DE | 102011117900 | 5/2013 |

(Continued)

*Primary Examiner* — Chinessa T. Golden
(74) *Attorney, Agent, or Firm* — McDonnell Boehnen Hulbert & Berghoff LLP

(57) ABSTRACT

The present invention relates to a micro-porous filtration membrane with performance enhancing projections as well as a method for producing the same.

15 Claims, 7 Drawing Sheets

(56) References Cited

U.S. PATENT DOCUMENTS

| | | | |
|---|---|---|---|
| 2003/0035943 A1* | 2/2003 | Jones | ................ B32B 27/32 |
| | | | 428/317.9 |
| 2005/0082215 A1 | 4/2005 | Swenson | |
| 2006/0009771 A1 | 1/2006 | Orbay et al. | |
| 2006/0016685 A1 | 1/2006 | Hawkins et al. | |
| 2008/0234677 A1 | 9/2008 | Dahners et al. | |
| 2008/0257153 A1 | 10/2008 | Harp | |
| 2012/0059376 A1 | 3/2012 | Rains et al. | |
| 2012/0298578 A1 | 11/2012 | Herrington et al. | |
| 2013/0184765 A1 | 7/2013 | Beyar et al. | |

FOREIGN PATENT DOCUMENTS

| | | |
|---|---|---|
| EP | 2 366 449 | 9/2011 |
| EP | 2 633 901 | 9/2013 |
| WO | WO 01/19504 | 3/2001 |
| WO | WO 01/19505 | 3/2001 |
| WO | WO 2014/039894 | 3/2014 |

\* cited by examiner

MEMBRANE WITH INCREASED SURFACE AREA

CROSS REFERENCE TO RELATED APPLICATIONS

This application is a section 371 U.S. national phase application of International patent application no. PCT/EP2015/001459, filed Jul. 15, 2015, which claims priority from India patent application no. 3545/CHE/2014, filed Jul. 18, 2014.

FIELD OF THE INVENTION

The present invention relates to a micro-porous filtration membrane with performance enhancing projections as well as a method for producing the same.

BACKGROUND OF THE INVENTION

Generally, the service life of membrane filters is directly dependent on their dirt holding capacity. This is also known as total throughput, the maximum volume quantity Vmax of a liquid solution filtered before the filter is blocked by any particulate contained in the solution. The blocking effect is often based on particulate deposition on the non-filtrate surface of the filter material. Filtration is understood to mean a method for separating solid particles or molecules from a fluid (i.e. liquids or gases), even insoluble liquid droplets from another liquid (emulsion) or from gases (aerosols). A common, essential feature of filtration is that a porous medium, such as a filter paper or membrane, is perfused by the continuous phase (i.e. a liquid or gas), with the solid particles, molecules, or droplets being retained (retention) at the same time on the surface of the porous medium or inside.

Porous membranes are used mainly in the methods of ultrafiltration, of microfiltration, and of dialysis. Whether a particle or molecule is retained by ultrafiltration membranes or microfiltration membranes depends, in addition to the operating conditions, in particular on its size and structure relative to the size and structure of the membrane pores. A typical area of use of microfiltration is, for example, the concentration of suspensions, whereas ultrafiltration is often used for fractionating dissolved low-molecular-weight materials and macromolecules. A complete separation with ultrafiltration requires in this context that the molecular weights of the materials to be fractionated differ by at least one order of magnitude.

The pore size of microfiltration (micro-porous) membranes is in the micrometer range, typically from about 0.08 to about 10 µm. The pore size of ultrafiltration membranes is mostly defined by specifying the limit at which 90% (or 95%) of the molecules of a particular molar mass are retained (molecular weight cutoff, MWCO).

The above-mentioned surface blocking behavior, which may be also referred to as clogging, is specifically present in the field of micro-porous membranes which are commonly applied to sterilizing processes in food and beverage filtration of water, wine, beer or biopharmaceutical filtration of cell and bacteria nutrition media or clarification and purification filtration of cell and bacteria broths. In the aforementioned processes, the particulates present in the feed to be filtered show typically a broad distribution, commonly in terms of a Gaussian distribution. Many of the filter devices used in these applications contain two different layers of membrane material. The first layer to be passed by the non-filtrate (feed) is designed for high total throughput, i.e. to retain particulate without being blocked by those as far as possible. The second layer, which is most often a layer with a smaller pore size, is designed to have a sterilizing effect to fully retain small contaminants to be removed from the filtrate, such as microorganisms like bacteria. The enhancement of total throughput and flow rate is primarily targeted to the first layer, less to the sterilizing layer in order to keep this free of defects for the retention of e.g. microorganisms.

The easiest way to increase the total throughput is to enlarge the filter area as such, i.e. the three-dimensional size of the filter material. The enlargement of the filter area is accompanied with higher costs due to an increased amount of the filter material and larger filter device sizes. As a compromise, the filter device size can be kept constant by maintaining its outer dimensions. In such a case, the higher quantity of filter material has to be arranged more compacted in the same device size. The higher compaction results in higher hydrodynamic resistance or vice versa lower flow rates at given pressure difference between the non-filtrate side and the filtrate side of the filter.

In order to increase the flow performance and total throughput of filter materials, several attempts have been proposed in the last decades. For example, DE 10 2011 117 900 A1 discloses a pleated filter element to be used for the filtration of e.g. oil-based suspensions, dispersions or emulsions, comprising a pre-filter layer and a main filter layer. The pre-filter layer comprises recesses which at least partially penetrate into the filter or completely penetrate through the filter layer. The recesses, which may be arranged in form of a pattern, increase the effective filter area and thus the dirt holding capacity of the filter element.

U.S. Pat. No. 6,203,741 B1 and U.S. Pat. No. 6,132,845 A describe methods for forming micro spike thermoplastic liners to be used for sealing tunnels, excavation sites, landfills, i.e. being liquid-impermeable, having at least one roughened surface with a plurality of irregularly shaped projections extending therefrom, which are preferably arranged in a regular pattern, at equal intervals to define columns and rows. The combination of the projections and the roughened surface allows the liner to frictionally engage a desired location. The liners are formed by a calendering process in which a smooth thermoplastic sheet is fed into a calender, which causes the smooth sheet to be formed as a thermoplastic liner having projections extending from one surface thereof.

CA 2 397 022 A1 describes a flat permeable membrane which may consist of polyether sulfones, having recesses on at least one side, wherein the dimensions of the recesses exceed the nominal pore size of the membrane by at least five-fold. The recesses, which may be in form of channels, have an average diameter of 5 to 500 µm, whereas the nominal pore size of the membrane is in the range from 0.2 nm to 5 µm. The thickness of the membrane is described to be from 1 µm to 1000 µm. Said membranes are produced by preparing a substrate, such as a silicon wafer, which has protrusions on its surface as a negative for the desired recesses, applying the membrane material or a precursor thereof onto the substrate and forming the porous membrane on the substrate using solvent evaporation and/or replacing the solvent with a precipitating agent.

US 2006/0016685 A1 discloses textured ion exchange membranes for use in an electrochemical cell, said membranes comprising an anion exchange layer abutting a cation exchange layer to form a heterogeneous water-splitting interface therebetween, and a textured surface having a pattern of texture features comprising spaced apart peaks and valleys, wherein the peak to peak distance (dpp) is at least 10 µm and the peak to valley distance (dpv) is at least 10 µm, whereas the aspect ratio dpv/dpp is 0.1 or more.

EP 2 366 449 A2 discloses a polymer membrane having repetitive convex-concave patterns formed on a surface in contact with a fluid to be treated. The membrane which may be made of a polysulfone-based material, has improved permeability and fouling properties, particularly when having a surface roughness of 1.1 to 1.5. The pattern of the membrane may be made using soft lithography technique used to form patterns in the technical field of semiconductors.

U.S. Pat. No. 7,309,385 B2 discloses a gas separation membrane of two or more layers comprising a supporting layer and an organic, porous, gas-permeable separating layer which may be made of polysulfone. The separating layer has a high effective separation area formed in terms of a three-dimensional nanostructure, which may be in form of protruded portions in tube form having a length of several tens nanometers to several millimeters, whereas the thickness of the protruded portion is several nanometers to hundred nanometers.

Further, in U.S. Pat. No. 3,724,673, a thin textured gas-permeable membrane for use in blood oxygenators and dialyzers is described, which comprises a film comprised of thermoplastic material having a myriad of thermoplastically formed deformations or undulations in terms of cones. These cones are plastically deformed in the membrane surface by localized bending and stretching in which case the cone regions are actually thinner than the parent membrane on which they are formed. The deformations or fine undulations constituting the texture are formed by placing a smooth membrane over a die on which a field of cones stands out in relief and applying a vacuum between the die and membrane so that air pressure deforms the latter in correspondence with the cone pattern.

Further, DE 10 2008 045 621 A1 discloses a gas-permeable and liquid-impermeable membrane used, for instance, for gassing or for gas exchange in blood, wherein the membrane is structured on at least one side, particularly on the non-filtrate side, which may consist of polyether sulfones. The membrane comprises channels and/or branched pathways which may either be in form of through-passages throughout the entire membrane or partially penetrate into the membrane such as blind branches. The walls of the channels have a spacing of 150 µm or less, and the proportion of the membrane surface area which comprises channels and/or branching structures having this spacing constitutes at least 50% of the total surface area of the membrane.

However, most of the aforementioned techniques for improving flow performance and total throughput of filter materials merely rely on increasing the applied area of filter material or have the drawback that the throughput is increased by incorporating channels penetrating through the entire membrane, whereby a desired filtration effect of retaining small contaminants to be removed from the filtrate cannot be achieved.

SUMMARY OF THE INVENTION

Thus, an object of the present invention is to provide a filter material capable to be used in the field of microfiltration which should have an improved total throughput and flow rate, without simply increasing the applied area of filter material in a filter device, as well as a simple and cost-efficient method for producing such a filter material.

The solution to the above technical problem is achieved by the embodiments characterized in the claims. In particular, the present invention provides a micro-porous filtration membrane comprising a plurality of three-dimensional projections extending from a second main surface of the membrane, wherein the three-dimensional projections are formed by stamping from a first main surface of the membrane opposite to the second main surface of the membrane.

The pore size, i.e. the size of the micropores, of the micro-porous membrane according to the present invention is from about 0.08 to about 20 µm, preferably from 0.1 to 15 µm, and more preferably from 0.2 to 10 µm. The pore size is the diameter of the mean flow pore detected by a capillary flow porometer analysis with the capillary flow porometer by Porous Materials Incorporated, 20 Dutch Mill Road, Ithaca, N.Y. using a Solvay Galden HT55 16 dyne/cm wetting fluid. Thus, the micro-porous filtration membrane according to the present invention refers to a liquid-permeable membrane.

According to the present invention, the micro-porous filtration membrane comprises a plurality of three-dimensional projections, which extend from the second main surface of the membrane, i.e. from the filtrate side of the membrane. These projections are formed by stamping upon which corresponding recesses are formed on the first main surface, i.e. the non-filtrate side, of the membrane opposite to the second main surface of the membrane. Within the present invention, the term "stamping" is used in its broadest sense intended to describe that the second main surface of the membrane is deformed by any means so as to form a recess within the membrane's first main surface and a corresponding projection extending from the second main surface. That means, according to the present invention, the plurality of three-dimensional projections originate from the micro-porous filtration membrane itself in a flat disc or sheet-like shape.

The recesses, which are concurrently formed on the first main surface of the membrane, thus form a rough surface on the micro-porous filtration membrane. In this regard, it should be noted that the recesses of the micro-porous filtration membrane are understood as macroscopic cavities which, however, differ from the micropores constituting the micro-porous membrane in their dimensions.

Thus, according to the present invention, due to the formation of the three-dimensional projections and recesses, the surface of the filtration area of the micro-porous filtration membrane can be increased.

In another aspect, the present invention relates to a method for producing the micro-porous filtration membrane according to the present invention, comprising the following steps:
  providing a micro-porous filtration membrane having a first and second main surface, and
  modifying the second main surface of the membrane so as to form a plurality of three-dimensional projections extending from the second main surface of the membrane by stamping from a first main surface of the membrane opposite to the second main surface of the membrane.

The micro-porous filtration membrane according to the present invention can be used in sterilizing processes such as food and beverage filtration of water, wine, beer or biopharmaceutical filtration of cell and bacteria nutrition media or clarification and purification filtration of cell and bacteria broths.

According to the present invention, the flow and total throughput of a given filter material can be improved not by a larger filter area, but by increasing the non-filtrate surface area, so that more efficient filter materials are generated. Hence a lower flow resistance or vice versa higher flow rate can be achieved. In particular, by modifying a membrane's surface not only on the non-filtrate side but in the thickness direction of the membrane, efficient micro-porous filtration membranes having an improved total throughput and flow rate can be achieved.

Thus, in another aspect, the present invention further relates to a method for improving the throughput and/or flow rate of a micro-porous filtration membrane, comprising the step of modifying the second main surface of the membrane so as to form a plurality of three-dimensional projections extending from the second main surface of the membrane by stamping from a first main surface of the membrane opposite to the second main surface of the membrane.

DESCRIPTION OF THE DRAWINGS

The present invention will be described in more detail herein-below with respect to the following embodiments along with the accompanying drawings, wherein.

DESCRIPTION OF THE INVENTION

Figure 1:
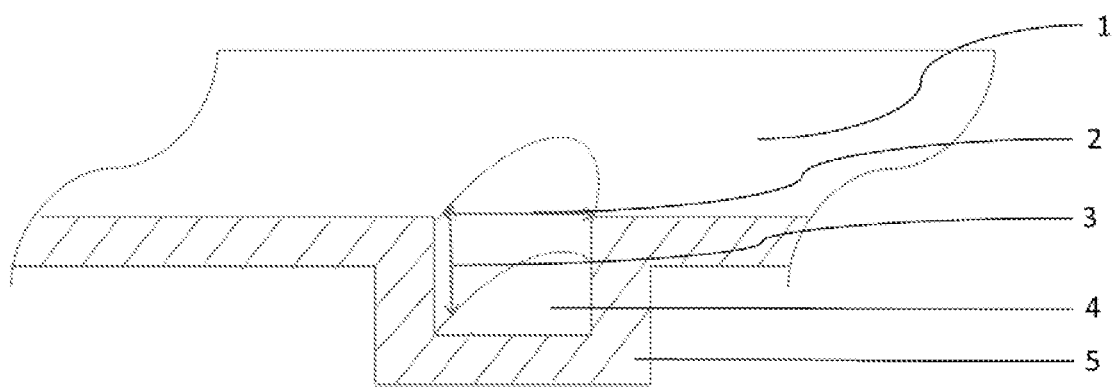
FIG. 1 illustrates the surface enlargement in porous structures by three-dimensional surface extension.

According to the present invention, the micro-porous filtration membrane has a plurality of three-dimensional projections extending from a second main surface of the Membrane, wherein the three-dimensional projections are formed by stamping from a first main surface of the membrane opposite to the second main surface of the membrane.

The micro-porous membrane according to the present invention may be composed of a single membrane layer or comprised of at least two membrane layers. According to a preferred embodiment, the micro-porous filtration membrane according to the present invention is a multi-layer membrane, comprising at least two membrane layers, wherein at least one membrane layer has a plurality of said three-dimensional projections. The at least one membrane layer having the three-dimensional projections may be combined with at least one other porous membrane layer not having the projections. That means, according to the present invention, the micro-porous filtration membrane may comprise at least one membrane layer having the three-dimensional projections and optionally at least one other porous membrane layer which may have flat main surfaces.

According to the present invention, the micro-porous membrane contains preferably at least two different membrane layers having different pore sizes such that a first layer to be passed by the feed at the upstream side (non-filtrate side) has a larger pore size compared to a second membrane layer at the downstream side (filtrate side). In particular, according to the present invention, the micro-porous membrane may include several retentive layers, according to which at least one layer made of a porous or micro-porous matrix material is provided on the non-filtrate side area of the membrane, i.e. a pre-filter, and at least one layer made of a micro-porous matrix material having preferably a smaller pore size is provided on the filtrate side area of the membrane in terms of an end-filter.

According to a particularly preferred embodiment, the at least one membrane layer having the plurality of three-dimensional projections is disposed on at least a second membrane layer, so that the projections are in contact with the second membrane layer. In such a case, it is preferred that the second membrane layer has a pore size smaller than the first membrane layer. That means, the pre-filter may have the projections contacting the end-filter. The latter may be a sheet or disc-like membrane.

According to the present invention, it is also possible that the at least one membrane layer having the plurality of three-dimensional projections is disposed in the micro-porous filtration membrane, so that a second membrane filter covers the first main surface having a plurality of recesses. In particular, the at least one membrane layer having the plurality of three-dimensional projections can be provided as the end-filter combined with another membrane layer in terms of a pre-filter having preferably a larger pore size disposed on the end-filter. Here, it is preferred that the surface on the filtrate side of the pre-filter contacts the first main surface of the end-filter.

In any case, if the at least one membrane layer having the plurality of three-dimensional projections is provided as a pre-filter or an end-filter, combined with at least one second membrane layer, the surfaces of each membrane layer abutting each other comprise spaces (cavities) by which the hydrodynamic properties of the membrane filter can be improved. That means, according to the present invention, in case the at least one membrane layer having the plurality of three-dimensional projections is provided as a pre-filter, the three-dimensional projections can be regarded as spacers between the pre-filter layer and the end-filter layer. Similarly, in case the at least one membrane layer having the plurality of three-dimensional projections is provided as an end-filter, the recesses function as macroscopic cavities within the micro-porous filtration membrane. In both cases, the filtrate side surface of the pre-filter does not entirely cover the surface of the end-filter on its non-filtrate side.

In addition, according to the present invention, it is also possible that both, the at least one pre-filter and at least one end-filter are provided with the plurality of three-dimensional projections. In such a case, it is possible that both membrane layers may have similar projections or different projections. If the projections in both membrane layers are identical, i.e. having a corresponding pattern and dimensions, it is possible that the membrane layers are stacked above, so that the longitudinal axes of the recesses (projections) are out of alignment, or that the longitudinal axes of the recesses (projections) are aligned insofar that the recesses of a first membrane layer may at least partially penetrate into the recesses of a second membrane layer.

According to the present invention, the arrangement of three-dimensional projections on the second main surface of the membrane is not particularly limited, and may be in form of a regular or irregular pattern. The term "irregular", or any derivative thereof as used herein, is intended to describe a shape which is not an evenly-formed geometric shape such as a circle, rectangle, parallelepiped, etc., or an arrangement which does not follow a specific pattern, wherein objects are aligned in terms of being evenly-spaced apart, both laterally and longitudinally, or any iterative pattern.

Preferably, in terms of procedural aspects, the plurality of three-dimensional projections form a regular pattern. In particular, it is preferred that the three-dimensional projections are homogeneously distributed on the second main surface of the membrane.

The three-dimensional projections may have various shapes and forms by which the total filtration surface of the micro-porous filtration membrane can be increased. For example, the cross-sectional profile of the projection may be circular, oval, rectangular, triangular, any higher polygon, or may have even any irregular shape. If the cross-sectional profile of the projection is for example circular, the projection thus may have a cylindrical, cone or frustum-like shape. However, the projection may have also a pyramidal shape including the shape of a tetrahedron, square, pentagonal, hexagonal and star pyramid. According to the present invention, the shape of the projections needs not to be uniform. Thus, the projections may have also different kinds of shapes.

According to a preferred embodiment of the present invention, the three-dimensional projections have a cylindrical, cone, or pyramidal shape or any combination thereof.

The orientation of the projections is preferably perpendicular or within an angle of 45°, more preferably 60°, most preferably 75°, with respect to the main surfaces of the membrane. That means, the projections are preferably formed so that the longitudinal axis of the corresponding recesses is perpendicular to the main surfaces of the membrane, or within an angle of 45° or more, more preferably 60° or more, most preferably 75° or more, with respect to the main surfaces of the membrane.

The dimensions of the projections are not specifically limited as long as the total filtration surface of the micro-porous filtration membrane can be increased. As it will be apparent for a person skilled in the art, the extent of the increase of the filtration surface can be influenced by the number of projections, i.e. the density of projections on the second main surface of the membrane, and the dimensions of the projections including their heights. Preferably, the density and dimensions of the projections are adjusted, so that the filtration surface can be increased by at least 10%, preferably by at least 20%, more preferably by at least 30%, even more preferably by at least 40%, or at least 50%. According to a particularly preferred embodiment, the filtration surface of the micro-porous membrane can be increased by 100% or more.

As will be apparent for a person skilled in the art, however, the density and dimensions of the projections, and thus the increase of the filtration surface, may be adjusted depending on the intended use of the membrane. In particular, the percentage of the area of the recesses on the first main surface of the membrane, which can be also referred to as the "degree of surface indentation", is preferably at least 1%, more preferably at least 5%, even more preferably at least 10%, and most preferably at least 15%. Since the structural strength of the resultant membrane decreases with an increased degree of surface indentation, the degree of surface indentation is preferably 80% or less, more preferably 70% or less, even more preferably 60% or less, and most preferably 50% or less. According to a particularly preferred embodiment of the present invention, the degree of surface indentation of the first main surface of the membrane is from 15 to 50%.

According to the present invention, the individual diameter of the recesses which correlates with the individual diameter of the projections, is from 100 µm to 10 mm, more preferably from 0.5 mm to 8 mm, even more preferably from 1 to 5 mm.

As mentioned above, the individual diameter of the recesses correlates with the individual diameter of the projections. Thus, depending on the thickness of the membrane layer having the projections, the individual diameter of the projections substantially corresponds to the sum of the individual diameter of the recesses and the twofold thickness of the membrane layer.

The thickness of the micro-porous membrane according to the present invention may be adjusted on the intended use and can range from 10 µm to 5 mm. Preferably, the thickness of the membrane is from 10 µm to 1 mm, more preferably from 20 µm to 500 µm. In this regard, it should be noted that, in case the micro-porous membrane according to the present invention is a single layer membrane, the aforementioned values relate to the total thickness of the membrane layer excluding the height of the projections as it is shown by reference numeral 5 given in FIG. 1.

For the preferred case, wherein the micro-porous filtration membrane is a multi-layer membrane comprising at least two membrane layers, the aforementioned values relate to the total thickness of the membrane layers including the height of the projections. The thickness of each of the separate membrane layers excluding the heights of the projections may be from 10 µm to 1 mm, preferably from 50 to 500 µm, even more preferably from 100 to 300 µm.

The height of the projections (3), which corresponds to the depth of the recesses, is preferably from 0.2 to 5 mm, more preferably 0.25 mm to 2.5 mm and most preferably 0.3 to 1 mm. The height of the projections is measured by SEM (Scanning Electron Microscopy) and the total thickness of the membrane is measured in parallel to the height of the projections by SEM. Alternatively, the thickness of the membrane can be measured by a thickness gauge ("Messtaster", Type J100 or J200, precision 0.001 mm, from Hahn and Kolb, Stuttgart, Germany). Alternatively, the height of the projections can be measured by using a measurement scale.

According to the present invention, the material used to form the micro-porous membrane is not particularly limited. For example, the membrane may be formed using a porous polymer membrane made from polyether sulfone (PESU) or polyamide (PA) or a cellulose derivative, such as cellulose mixed ester, cellulose acetate, cellulose nitrate or cellulose, or polypropylene (PP) or polyethylene (PE) or polytetrafluoroethylene (PTFE) and/or expanded polytetrafluoroethylene (ePTFE) or polyvinylidene difluoride (PVDF) or polyvinyl chloride (PVC). The filter material may also be formed using mineral or polymer fiber filtration media or bonded and/or non-bonded non-wovens, such as spunlaids or melt-blown spunlaids or staple fiber webs or carded webs (either calendared or non-calendared), or using cellulose, polyamide (PA), expanded polytetrafluoroethylene (ePTFE), ethylenetetrafluoroethylene (ETFE), polyether etherketon (PEEK), polyether sulfone (PESU), polyphenylensulfide (PPS), or polyester or polyolefins, such as PE or PP, or glass fibers or glass microfibers. In addition, it is possible for the filter material to be formed using a fabric or an extruded net made of at least one of the aforementioned polymers.

Moreover, according to the present invention, it is possible that the filter material is formed using a functionalized porous filtration medium, such as a modified polymer membrane made of polypropylene (PP), polyethylene (PE), polyvinylidene difluoride (PVDF), polyamide (PA), expanded polytetrafluoroethylene (ePTFE), polyether sulfone (PESU), cellulose acetate (CA) or cellulose nitrate (CN).

Depending on the filter material used to form the micro-porous membrane, the membrane according to the present invention may be rigid or flexible. Furthermore, depending on the desired use of the membrane, it is possible that the membrane according to the present invention is formed so as to be used for dead-end filtrations, such as a flat membrane plate (i.e. disc like), or for cross-flow filtrations, according to which the membrane may be in form of spiral wounds or hollow fibers.

Preferably, the micro-porous membrane is a porous polymer membrane made from polyether sulfone (PESU) or polyamide (PA) or polyvinylidene difluoride (PVDF) or a cellulose derivative. The micro-porous membrane according to the present invention may be also made of a combination of the aforementioned materials.

As mentioned above, the micro-porous membrane according to the present invention may be composed of a single membrane layer or comprised of at least two different layers of membrane material. Preferably, the micro-porous membrane contains at least two different membrane layers having different pore sizes such that the first layer to be passed by the feed has a larger pore size compared to the second membrane layer. The at least two different membrane layers may be made from the same material or may be made from different materials.

According to a further preferred embodiment, the three-dimensional projection on the second main surface of the membrane is the negative stamping shape of the positive stamping shape of the three-dimensional projection stamped from the first main surface of the membrane.

To produce the micro-porous filtration membrane according to the present invention, the equipment and devices and machinery conventionally used for the production of membrane filters may be used, saving costs for additional or specific equipment and devices. In particular, according to the present invention, the step of providing the micro-porous filtration membrane can be carried out by conventional methods known in the art.

According to the present invention, such micro-porous structures, preferably in terms of micro-porous polymeric membranes, are modified at their second main surface, i.e. filtrate surface, so as to form a plurality of three-dimensional projections extending from the second main surface of the membrane by applying a device comprising at least one stamp on the first main surface of the membrane, for example. In a preferred embodiment the stamps of the device each have a circular geometry with a diameter of 3.9 mm, wherein the distance between adjacent stamps is 2.6 mm (see FIG. 5). Concurrently, based on said stamping, recesses are formed on the first main surface, i.e. non-filtrate surface. According to the present invention, the stamping in terms of modifying the second main surface of the membrane is not particularly limited as long as a plurality of three-dimensional projections extending from the second main surface of the membrane can be formed.

According to the present invention, any suitable method known in the art capable to form the three-dimensional projections can be used. For example, the deformation of the membrane may be achieved by punching, embossing or deep drawing.

Preferably, according to the present invention, upon forming the three-dimensional projections, the micro-porous structure of the material constituting the filtration membrane is substantially not impaired in terms of being compressed, so as to maintain the micro-porous structure.

Figure 2:
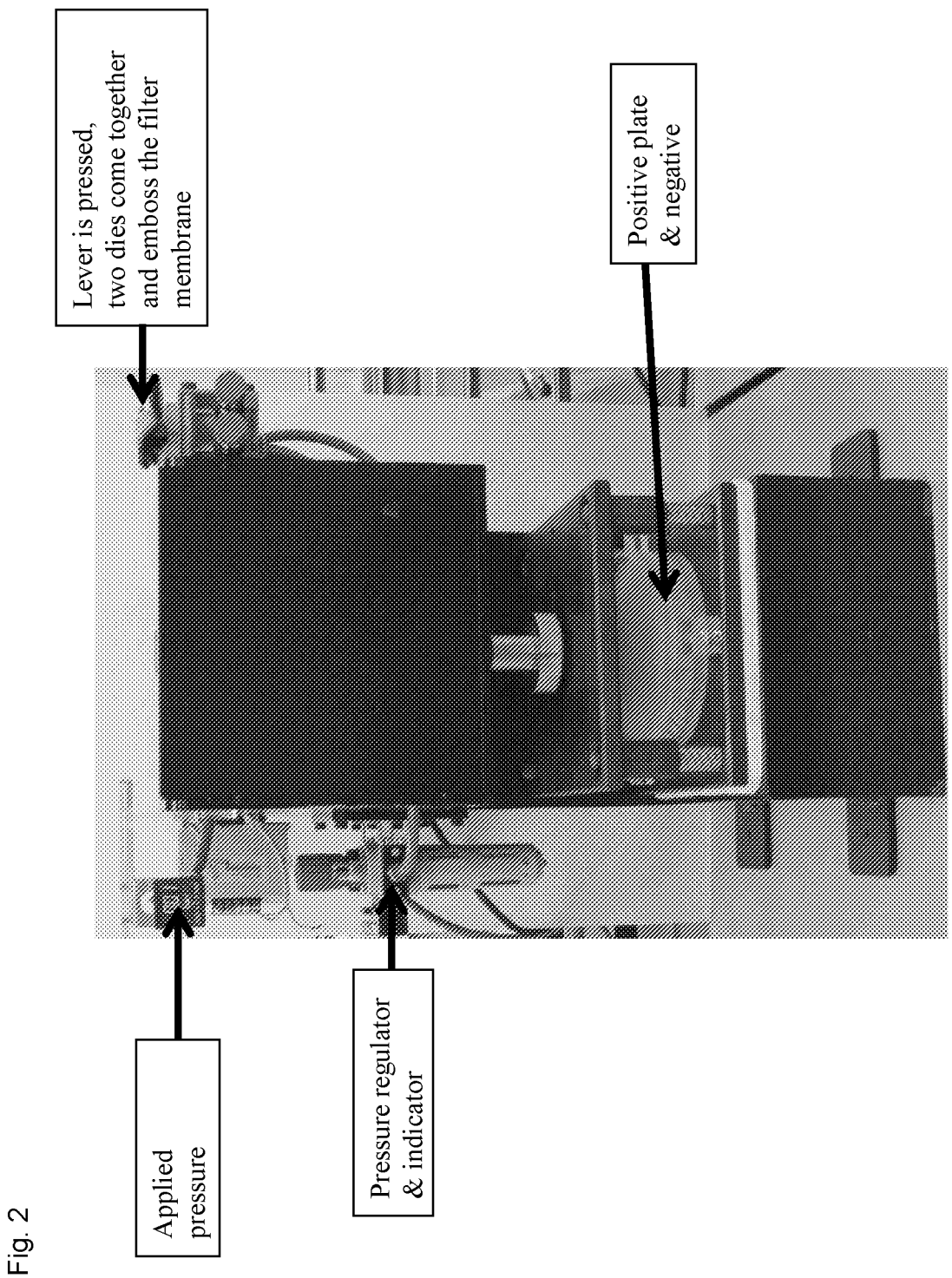
FIG. 2 shows a stamping device used to push projections into 142-mm membrane discs.

In particular, the step of modifying the second main surface of the membrane may be carried out by using a stamping device, as it is exemplary shown in FIG. 2, including a stamp of a desired shape. The form of the first stamp (hereinafter "positive stamp") corresponds to the shape of the recesses to be formed and the negative form (hereinafter "negative stamp") of the projections to be formed, respectively (see also FIGS. 6(a) to (6(d)). The projections may be pushed out of the membrane's non-filtrate to the filtrate side or may be drawn from the membrane's filtrate side to the non-filtrate side in case the stamping is done on the downstream surface of the membrane. The deformation may be carried out upon application of a specific pressure, which may be typically in the range up to several bars depending on the material constituting the membrane. In particular, a pressure of approximately 1.0 to 1.5 bar may be applied.

As mentioned above, according to the present invention, it is preferred that the step of modifying the second main surface so as to form the projections is carried out in such a way that the micro-porous structure of the membrane is substantially not affected at all. That means, according to the present invention, the micro-porous structure is substantially not compressed, whereby the tendency that the membrane may be blocked or that the flow rate may be reduced can be minimized.

For example, the filter membrane may be embossed by placing the filter membrane between the positive stamp and the negative stamp having a shape being a negative to the positive stamp. The desired pressure required to emboss the filter membrane can be adjusted using a pressure regulator. After the desired pressure has been reached (as displayed on the pressure gauge on the pressure regulator as shown in FIG. 2), the two stamps are brought in contact with each other by pressing a lever on the stamping device shown in FIG. 2. The positive stamp may have circular projections and each circular projection may have, for example, a diameter of 3 mm and height of 0.5 mm.

Figure 5:
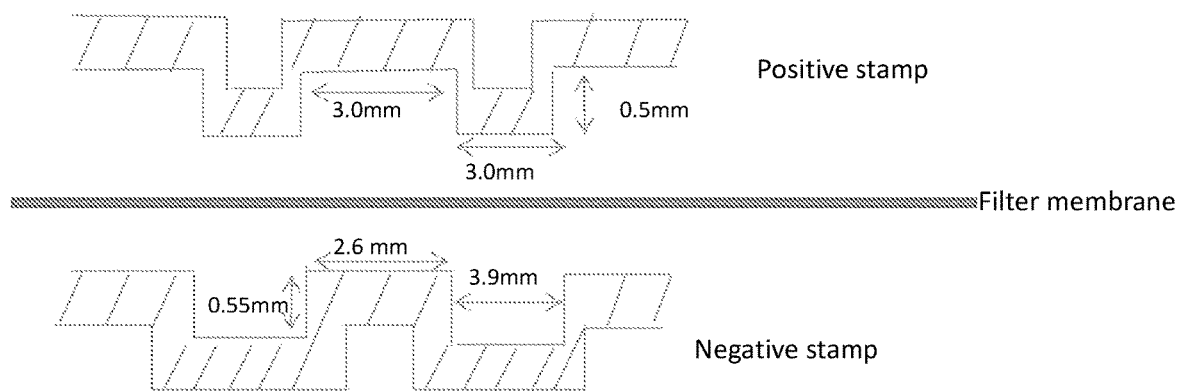
FIG. 5 shows a schematic drawing of a positive and negative stamp.
Figure 6A:
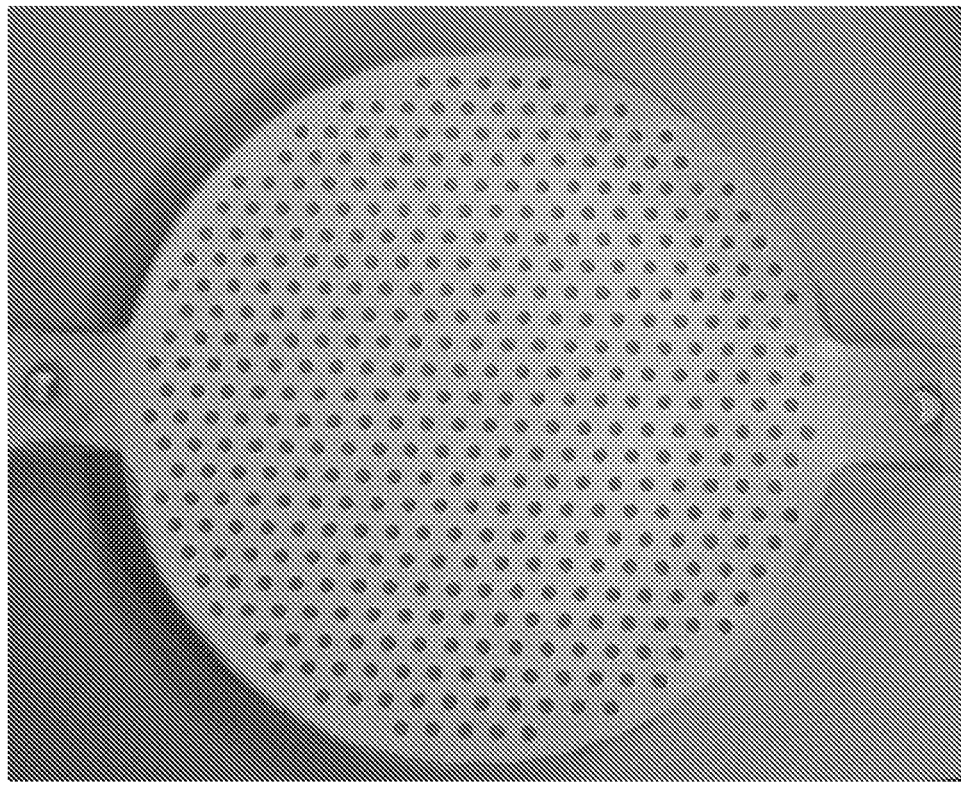
FIG. 6(a) shows an example of a positive stamp.
Figure 6B:
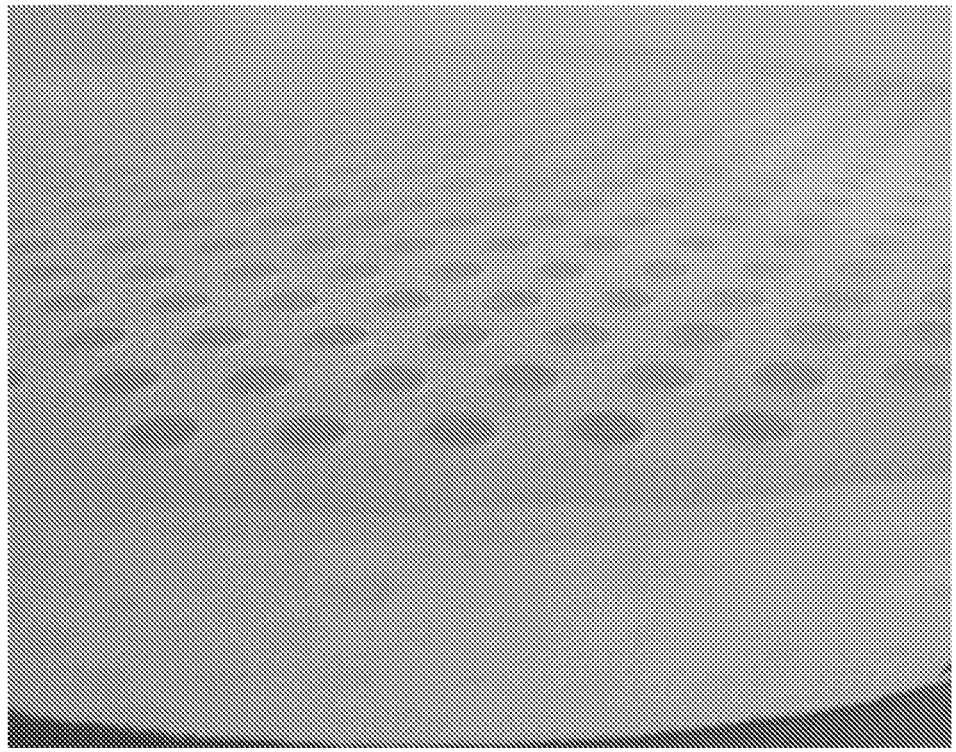
FIG. 6(b) shows a close up of the positive stamp shown in FIG. 6(a)

As shown in FIG. 5, the distance between two projections may be 3.0 mm (see FIG. 5 and FIGS. 6(a) and 6(b)).

Figure 6C:
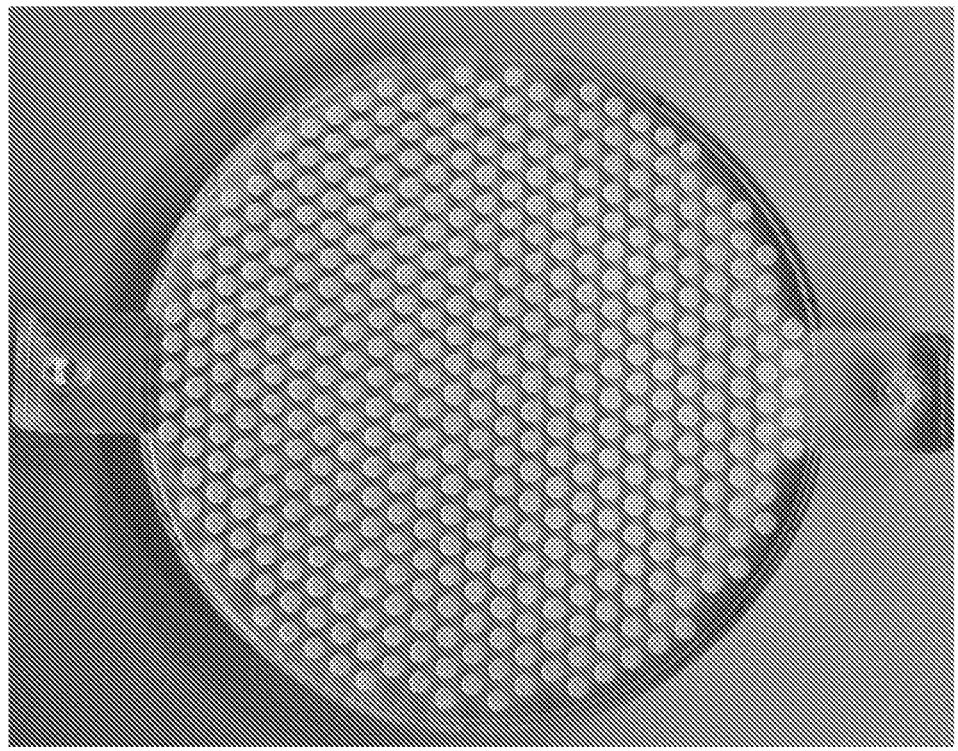
FIG. 6(c) shows an example of a negative stamp.
Figure 6D:
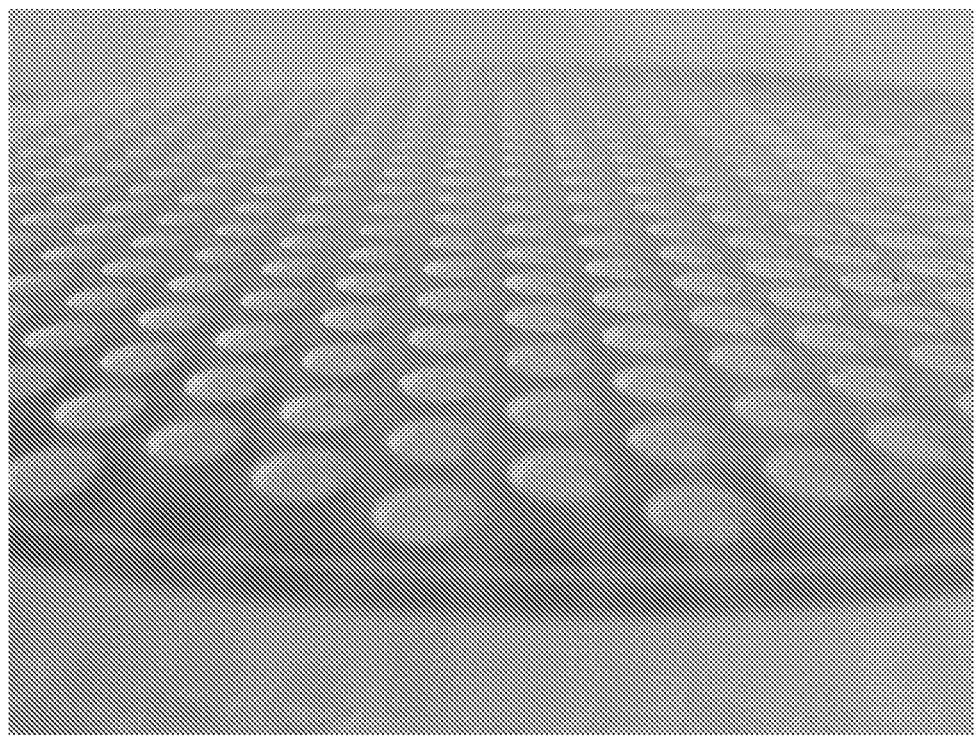
FIG. 6(d) shows a close up of the negative stamp shown in FIG. 6(c)

Further, the negative stamp may have a circular depression and each circular depression may have a diameter of 3.9 mm and depth of 0.55 mm and the distance between two depressions may be 2.6 mm (see FIG. 5 and FIGS. 6(c) and 6(d)). Both of the positive and negative stamps shown in FIG. 6 have a diameter of 13.8 cm capable to emboss a 142-mm filter membrane (see FIGS. 6(a) and 6(c)). As will be apparent for a person skilled in the art, however, the aforementioned dimensions may be adjusted depending on the intended use of the membrane.

According to the present invention, the flow and total throughput of a given filter material can be improved by a larger filter area, so that more efficient filter materials are generated. Hence a lower flow resistance or vice versa higher flow rate can be achieved. Moreover, the three-dimensional projections can act as a kind of spacer, if a pre-filter layer is combined with an end-filter layer. Thereby, it is possible to improve the overall hydrodynamic properties of the membrane.

The present invention will be described in more detail herein-below with respect to the following examples.

EXAMPLES

Performance Evaluation, Total Throughput and Flow Rate

Figure 4:
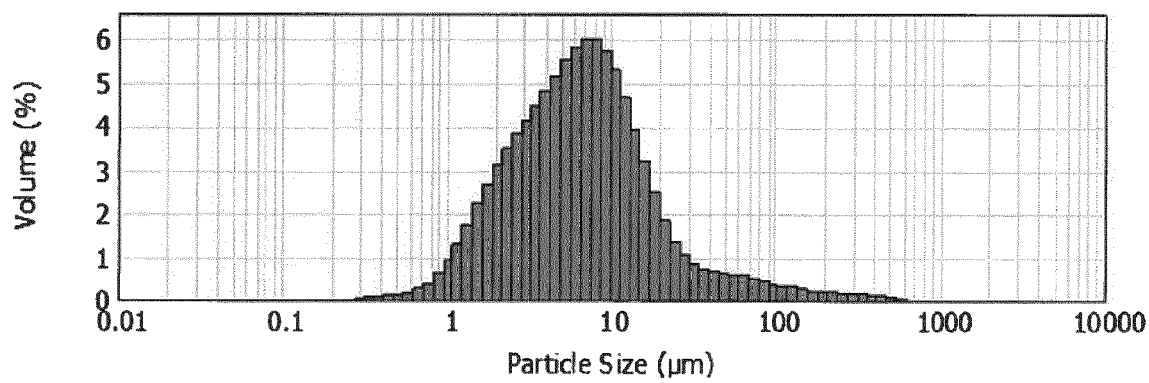
FIG. 4 shows a particle size distribution of a used model solution to evaluate performance of total throughput.

Total throughput performance was measured with help of a particulate model solution having a particle distribution as shown in FIG. 4. Ingredients of this solution were mainly carbohydrates, lipids and particles of malt, barley and rye. The test skid used consists of a balance, pressure sensor, pressure vessel and a filter holder. A connected software calculated current flow and blocking of the tested filter. The model solution was filtered through the membranes at a constant pressure of 1 bar. A test was finished when the membrane filter or filter combination reached a blocking of 93 to 95%. This refers to 5 to 7% of initial/maximum flow, whereby flow was measured as a function of filtrate mass per time. The theoretical maximum filterable amount (Vmax) was calculated by regression (implemented in software) and is the theoretical maximum throughput calculated by the regression to a throughput curve (weight over time) at 7%, respectively 5%, flow of the initial flow. The software which was used for data collection and as well for Vmax determination is called LimsMultiStandzeit. It is a Sartorius intern Software version 1.3.06.

Flow performance was measured by using a similar test skid as described above. RO (reverse osmosis) water was filtered through the membrane at constant pressure of 1 bar for 1 min. The resulting filtration volume leads to flow performance given as "Flow Rate" in [ml/min] and [L/min], respectively.

Filter Materials

The following evaluations were made by using a combination of polymeric phase inversion membranes using hydrophilic polyether sulfone as the basis polymer, the pre-filter type 15445 and final or main filter type 15407, both commercially available from Sartorius Stedim Biotech GmbH, Germany. A polymer solution was spread on a support; the membrane side formed facing this belt is called belt side. The types 15445/15407 were specified with a thickness from 145 to 175 and 140 to 160 µm, respectively, and a nominal pore size of 0.5 µm and 0.2 µm, respectively. Membranes were tested, so that the belt side is facing the non-filtrate (upstream) side. Here, both discs were wetted with RO water and stacked one upon the other and sealed within a disc filter holder.

Example 1—Disc Filters

A micro-porous polymeric membrane was modified in such a way that its overall area is to be extended. This is achieved by local deformations of the porous matrix. The deformation of a cylindrical shape was applied in the orthogonal direction to the membrane's original extension (see FIG. 1).

Figure 3:
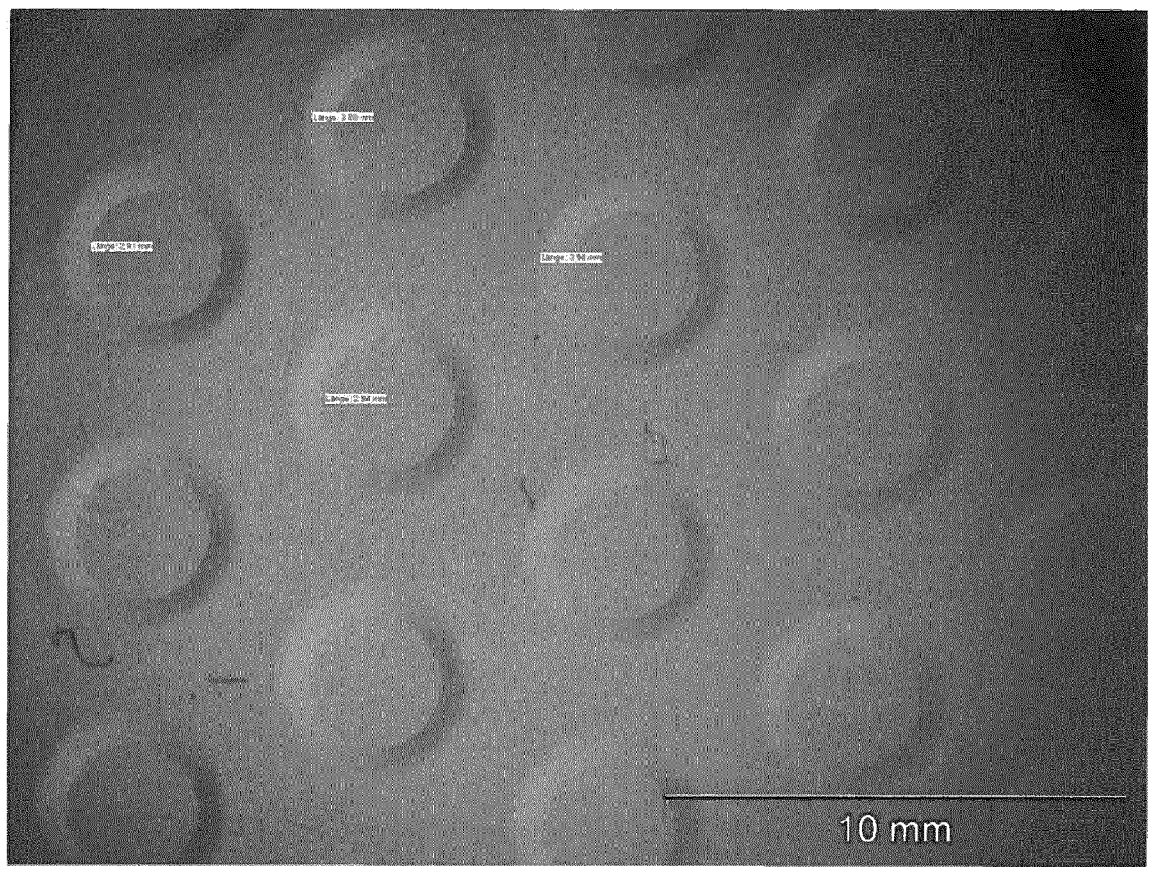
FIG. 3 shows the homogeneous distribution of multiple projections of the micro-porous membrane obtained in Example 1, sample 15407.

The projections were formed by using a stamping device as shown in FIG. 2 including cylindrical bumps, which generate projections at the filtrate side having the same distance between each other, which results in a regular projection pattern (see FIG. 3). The projections were pushed out of the membrane's non-filtrate to filtrate side with a pressure of approximately 1.0 to 1.5 bar. Said projections fill the area of a 142-mm diameter disc of a membrane.

The filter membrane was embossed by placing the filter membrane between the positive stamp and the negative stamp having a shape being a negative to the positive stamp. The desired pressure (1, 1.2 or 1.5 bar) required to emboss the filter membrane was adjusted using a pressure regulator. After making sure the desired pressure was displayed on the pressure gauge on the pressure regulator, the two stamps were brought in contact with each other by pressing a lever on the stamping device shown in FIG. 2. The positive stamp had circular projections and each circular projection had a diameter of 3 mm and height of 0.5 mm (see FIGS. 5, 6(a) and 6(b)). The distance between two projections was 3.0 mm. The negative stamp had a circular depression and each circular depression had a diameter of 3.9 mm and depth of 0.55 mm and the distance between two depressions was 2.6 mm (see FIGS. 5, 6(c) and 6(d)). Both of the positive and negative stamps had a diameter of 13.8 cm able to emboss a 142-mm filter membrane (see FIGS. 6(a) and 6(c)).

The embossed 142-mm disc filter was cut into a 47-mm disc filter and evaluated for flow rate and throughput. The 47-mm disc filter had a surface area of 13 cm$^2$ and 58 indentations. The increase in surface area due to a single circular indentation would be 5.2 mm$^2$ (based on the formula $A_{ind}=2\pi \cdot r \cdot h = (2 \cdot 3.14 \cdot 1.5 \cdot 0.55)$ mm$^2$=5.2 mm$^2$). Therefore, the increase in surface area considering all the 58 projections is 5.2 mm$^2 \cdot 58=300.5$ mm$^2$=3 cm$^2$. Thus, the new surface area of an embossed 47-mm disc filter is 13 cm$^2$+3 cm$^2$=16 cm$^2$. The percentage increase in surface area of the 47-mm disc filter is $((16-13)/13) \cdot 100=23\%$.

The potential of this method is given in the following Table 1 showing the theoretical maximum throughput (Vmax) of a particulate model solution determined at a flow ≤5% of initial flow. Here, the micro-porous polymeric membrane combination of types 15445 and 15407 was tested. Both membranes were extended separately under a pressure of 1.0 to 1.5 bar. These samples were tested in reference to an untreated combination of the same membrane types. Both combinations, treated and untreated, were taken from the same membrane lots and rolls.

Figure 7:
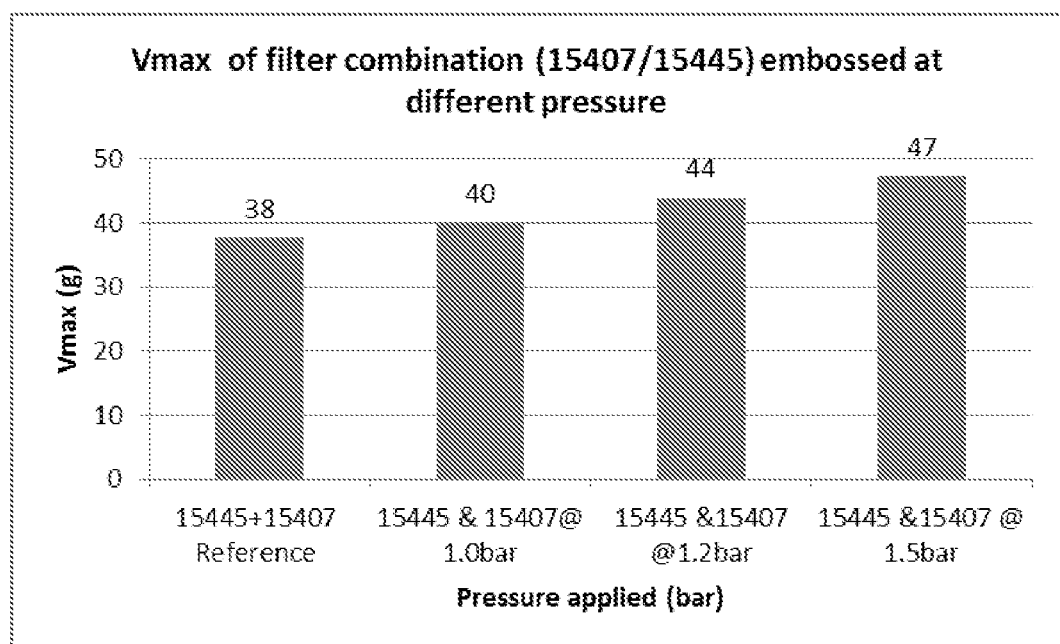
FIG. 7 shows the values of Vmax obtained in Example 1.

In this context, the average values of several repetitions in a two layer stack were determined, the result of which is given in Table 1 and FIG. 7. The column "Benefit to ref. Sample" indicates the enhancement in Vmax of each sample in view of the reference sample in percent. The membrane combination translates into a benefit of maximum 24% compared to the reference sample.

TABLE 1

| Samples | Vmax [g] | Benefit to ref. Sample [%] |
|---|---|---|
| Ref. Sample | 38 | 0 |
| 15445 & 15407/1.0 bar* | 40 | 5 |
| 15445 & 15407/1.2 bar* | 44 | 16 |
| 15445 & 15407/1.5 bar* | 47 | 24 |

*denotes pressure applied on membrane during stamping

The values of Vmax of the filter combination (15445+15407) increase as the pressure of embossing increases from 1.0 bar to 1.2 bar and 1.5 bar, as it is also illustrated in FIG. 7. The corresponding percentage increase in Vmax is 5% at 1 bar, 16% at 1.2 bar and 24% at 1.5 bar. Table 2 shows the results obtained for the flow performance.

TABLE 2

| Trial | Structure used | Flow Rate at 1.0 bar pressure (ml/min) | | | | | | | Benefit to ref. Sample [%] |
|---|---|---|---|---|---|---|---|---|---|
| | | T1 | T2 | T3 | T4 | 15 | average | STDEV | |
| 1 | Ref. Sample | 191 | 196 | 197 | 207 | 198 | 198 | 6 | 0 |
| 2 | Embossed at 1.5 bar | 197 | 203 | 208 | 213 | 226 | 209 | 11 | 6 |

Ref. Sample = membrane not embossed
STDEV = standard deviation

From the above results, according to the present invention, compared to an untreated membrane, it is possible to improve the filtration performance of the embossed filtration membrane by 6% in terms of the flow rate (ml/min).

Because different sections of membrane rolls were used for making the combination of pre-filter and main filter, there are fluctuations in the flow rate ranging from 197 ml/min to 226 ml/min.

Example 2—Pleated Devices (Cartridges)

Similar to Example 1, pre-filter and main filter membrane rolls were embossed at 1.5 bar pressure using the stamping device shown in FIG. 2. Small scale pleated devices (cartridges) were prepared with the pre-filter and main filter embossed rolls. The maximum throughput (Vmax in [g]) of a particulate model was determined at a flow of 5% of initial flow and given in Table 3 below.

TABLE 3

| Trial | Structure used | EFA [m$^2$] | T1 | T2 | average | STDEV | Benefit to ref. Sample [%] |
|---|---|---|---|---|---|---|---|
| 1 | Ref. Sample | 0.06 | 2051 | 2098 | 2075 | 33.2 | 0 |
| 2 | Embossed at 1.5 bar | 0.06 | 2372 | 2109 | 2240.5 | 186 | 8 |

STDEV = standard deviation
EFA = Effective Filtration Area

Table 4 shows the results obtained for the flow performance.

TABLE 4

| Trial | Structure used | EFA [m$^2$] | Flow Rate at 1.0 bar pressure (L/min) | | | | Benefit to ref. Sample [%] |
|---|---|---|---|---|---|---|---|
| | | | T1 | T2 | average | STDEV | |
| 1 | Ref. Sample | 0.06 | 10.5 | 10.8 | 10.7 | 0.2 | 0 |
| 2 | Embossed at 1.5 bar | 0.06 | 12 | 11.4 | 11.7 | 0.4 | 10 |

From the above results, according to the present invention, compared to an untreated membrane, it is possible to improve the filtration performance of the embossed filtration membrane by 10% in terms of the flow rate (L/min).

In a 47-mm disc filter, it was observed that Vmax could be increased by 24% at 1.5 bar stamping pressure as compared to the reference filter (see Table 1), whereas in a small-scale pleated device Vmax could be increased by 8% as compared with the pleated not-embossed reference (see Table 3). However, further optimisation of pleating the embossed filter membranes in the cartridges lead to Vmax values approaching the 24-% value for the 47-mm disc filter.

As can be taken from the above results, according to the present invention, compared to an untreated membrane, it is possible to improve the filtration performance of the micro-porous filtration membrane by 24% in terms of the total throughput simply by forming three-dimensional projections.

The improvement resides on the one hand on the enlargement of the total filtration surface. In addition, since the three-dimensional projections/recesses act in the combination of a pre-filter and an end-filter as a kind of spacer, the surfaces are not covered by themselves, as it is the case in the reference sample. This translates in better hydrodynamics within the membrane combination.

LIST OF REFERENCE NUMERALS

1 first main surface (non-filtrate side) of the membrane;
2 diameter of the recess;
3 height of the projection (depth of the recess);
4 bottom of the recess;
5 micro-porous membrane, (total) thickness of the membrane.

The invention claimed is:

1. A micro-porous filtration membrane comprising a plurality of three-dimensional projections extending from a second main surface of the membrane and originating from the micro-porous filtration membrane itself in a flat disc shape characterized in that the micro-porous structure of the material constituting the filtration membrane is substantially not compressed and in that the three-dimensional projections are formed by stamping from a first main surface of the membrane opposite to the second main surface of the membrane upon which corresponding recesses are formed on the first main surface, wherein the three-dimensional projection on the second main surface of the membrane is the negative stamping shape of the positive stamping shape of the three-dimensional projection stamped from the first main surface of the membrane, wherein the microporous filtration membrane is a multi-layer membrane comprising at least two different membrane layers having different pore sizes such that a first membrane layer on the non-filtrate side has a larger pore size compared to a second membrane layer on the filtrate side, wherein at least one of the first or second membrane layers comprises a plurality of said three dimensional projections, and wherein said at least one of the first or second membrane layers comprising the plurality of said three dimensional projections is made from polyether sulfone or polyvinylidene difluoride or a cellulose derivate or a combination thereof.

2. The micro-porous filtration membrane according to claim 1, wherein the at least one membrane layer comprising a plurality of said three-dimensional projections is disposed on at least a second membrane layer so that the projections are in contact with the second membrane layer.

3. The micro-porous filtration membrane according to claim 1, wherein the plurality of three-dimensional projections form a regular pattern.

4. The micro-porous filtration membrane according to claim 1, wherein the three-dimensional projections have a cylindrical, cone, or pyramidal shape or any combination thereof.

5. The micro-porous filtration membrane according to claim 1, wherein the percentage of the area of recess on the first main surface of the membrane is from 15 to 50%.

6. A micro-porous, multi-layer filtration membrane comprising:
  at least one first porous membrane layer comprising first main surface and a second main surface, a plurality of three-dimensional projections extending from the second main surface of the at least one first porous membrane layer, and a plurality of corresponding recesses present on the first main surface of the at least one first porous member layer, wherein the three-dimensional projections and corresponding recesses of the at least one first porous membrane layer are formed by stamping the first main surface opposite to the second main surface of the at least one first porous membrane layer; and
  at least one second porous membrane layer disposed on the first main surface or on the second main surface of the at least one first porous membrane layer,
  wherein the at least one first porous membrane layer and the at least one second porous membrane layer have different pore sizes such that the at least one first porous membrane layer or the at least one second porous membrane layer on a non-filtrate side of the filtration membrane has a larger pore size compared to the other membrane layer on a filtrate side of the filtration membrane, wherein the filtration membrane has a micro-porous structure that is substantially not compressed, and wherein said at least one of the first or second membrane layers comprising the plurality of said three dimensional projections is made from polyether sulfone or polyvinylidene difluoride or a cellulose derivate or a combination thereof.

7. The micro-porous, multi-layer filtration membrane according to claim 6, wherein the at least one second porous membrane layer is disposed on the second main surface of the at least one first porous membrane layer such that the plurality of three-dimensional projections on the second main surface is in contact with the at least one second membrane layer.

8. The micro-porous, multi-layer filtration membrane according to claim 7, wherein the at least one first porous membrane layer has a larger pore size compared to the at least one second porous membrane layer.

9. The micro-porous, multi-layer filtration membrane according to claim 6, wherein the plurality of three-dimensional projections form a regular pattern.

10. The micro-porous, multi-layer filtration membrane according to claim 6, wherein the plurality of three-dimensional projections have a cylindrical, cone, or pyramidal shape or any combination thereof.

11. The micro-porous, multi-layer filtration membrane according to claim 6, wherein a percentage of an area of the plurality of recesses on the first main surface of the at least one first porous membrane layer ranges from 15 to 50%.

12. The micro-porous, multi-layer filtration membrane according to claim 6, wherein the filtration membrane is made from at least one of polyether sulfone, polyamide, a cellulose derivative, cellulose mixed ester, cellulose acetate, cellulose nitrate, cellulose, polypropylene, polyethylene, polytetrafluoroethylene, expanded polytetrafluoroethylene, polyvinylidene difluoride, or polyvinyl chloride.

13. The micro-porous, multi-layer filtration membrane according to claim 6, wherein the at least one second porous membrane layer further comprises a first main surface and a second main surface, a plurality of three-dimensional projections extending from the second main surface of the at least one second porous membrane layer, and a plurality of corresponding recesses present on the first main surface of the at least one second porous membrane layer.

14. A method for producing a micro-porous, multi-layer filtration membrane according to claim 1, comprising the following steps:
  providing a first membrane layer and a second membrane layer, the first membrane layer having a first main surface and a second main surface;
  modifying the first membrane layer so as to form a plurality of three-dimensional projections extending from the second main surface and a plurality of corresponding recesses on the first main surface of the first membrane layer,
  characterized in that the step of modifying the first membrane layer is carried out by stamping from the first main surface of the first membrane layer opposite to the second main surface of the first membrane layer by using a stamping device including a positive stamp and a negative stamp, wherein a form of the positive stamp corresponds to a shape of the recesses to be formed and a form of the negative stamp corresponds to a shape of the projections to be formed; and
  disposing the second membrane layer onto the first main surface or the second main surface of the first membrane layer.

15. A method for sterilizing, clarifying or purifying a liquid in sterilizing processes in food and beverage filtration of water, wine, beer or biopharmaceutical filtration of cell and bacteria nutrition media or clarification or purification filtration of cell and bacteria broths comprising filtering the liquid through the micro-porous filtration membrane of claim 1.

* * * * *